United States Patent
Bo et al.

(10) Patent No.: US 10,530,592 B2
(45) Date of Patent: Jan. 7, 2020

(54) METHOD AND APPARATUS FOR SHARING BROWSER CONTENTS

(71) Applicant: TENCENT TECHNOLOGY (SHENZHEN) COMPANY LIMITED, Shenzhen (CN)

(72) Inventors: Chuanchuan Bo, Shenzhen (CN); Meina Li, Shenzhen (CN); Jie Hou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 420 days.

(21) Appl. No.: 14/606,225

(22) Filed: Jan. 27, 2015

(65) Prior Publication Data

US 2015/0142892 A1 May 21, 2015

Related U.S. Application Data

(63) Continuation of application No. PCT/CN2013/083408, filed on Sep. 12, 2013.

(30) Foreign Application Priority Data

Sep. 14, 2012 (CN) .......................... 2012-1 0341347

(51) Int. Cl.
*H04L 12/18* (2006.01)
*H04L 29/08* (2006.01)
*H04L 9/32* (2006.01)

(52) U.S. Cl.
CPC .......... *H04L 12/1822* (2013.01); *H04L 67/22* (2013.01); *H04L 9/32* (2013.01); *H04L 12/18* (2013.01)

(58) Field of Classification Search
None
See application file for complete search history.

(56) References Cited

U.S. PATENT DOCUMENTS

2002/0138582 A1 * 9/2002 Chandra ................ G06Q 10/10
709/206
2004/0087326 A1 † 5/2004 Dunko
(Continued)

FOREIGN PATENT DOCUMENTS

| CN | 101272355 A | 9/2008 |
|----|-------------|--------|
| CN | 102567532 A | 7/2012 |
| WO | 2012031262 A1 | 3/2012 |

OTHER PUBLICATIONS

Federal State Intellectual Property Service Federal Institute of Industrial Property (FGU FIPS) Notification on the results of examination for patentability for Application No. 2014136090/08(058395) dated Aug. 8, 2016 p. 1-7.

(Continued)

*Primary Examiner* — James A Edwards
(74) *Attorney, Agent, or Firm* — Anova Law Group, PLLC

(57) ABSTRACT

Various embodiments provide methods and apparatus for sharing browser contents. In an exemplary method, an electronic device can receive contents for sharing selected by a user and a sharing platform selected by the user. The electronic device can jump to a unified verification interface for the user to log in to the sharing platform through the unified verification interface. Further, the electronic device can submit the contents to the sharing platform for sharing.

15 Claims, 5 Drawing Sheets

(56) References Cited

U.S. PATENT DOCUMENTS

| | | | |
|---|---|---|---|
| 2004/0254956 A1* | 12/2004 | Volk | G06F 17/30038 |
| 2006/0101119 A1* | 5/2006 | Qureshi | G06Q 10/107 709/206 |
| 2007/0157104 A1* | 7/2007 | Blain | G06F 3/04842 715/771 |
| 2007/0214002 A1* | 9/2007 | Smith | G06F 19/328 705/2 |
| 2008/0204827 A1* | 8/2008 | Yoshio | H04N 1/00212 358/498 |
| 2009/0282052 A1 | 11/2009 | Evans et al. | |
| 2009/0292762 A1* | 11/2009 | Mettala | G06Q 30/02 709/203 |
| 2010/0095294 A1* | 4/2010 | Yamada | G06F 8/61 717/174 |
| 2010/0235266 A1† | 9/2010 | Sirajuddin | |
| 2010/0312464 A1* | 12/2010 | Fitzgerald | G01C 21/343 701/532 |
| 2011/0055909 A1* | 3/2011 | Dowlatkhah | G06F 21/31 726/6 |
| 2012/0324121 A1* | 12/2012 | Carr | G06Q 50/01 709/229 |
| 2013/0133056 A1* | 5/2013 | Taylor | G06F 21/41 726/8 |
| 2013/0326368 A1* | 12/2013 | Voas | G06Q 50/32 715/753 |

OTHER PUBLICATIONS

The State Intellectual Property Office of the People's Republic of China (SIPO) Office Action 1 for 201210341347.3 dated May 26, 2017 pp. 1-9.

\* cited by examiner
† cited by third party

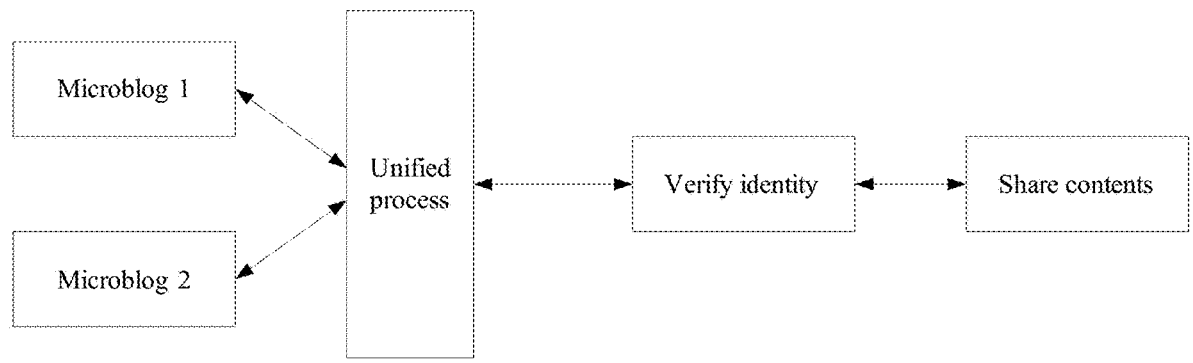
FIG. 3
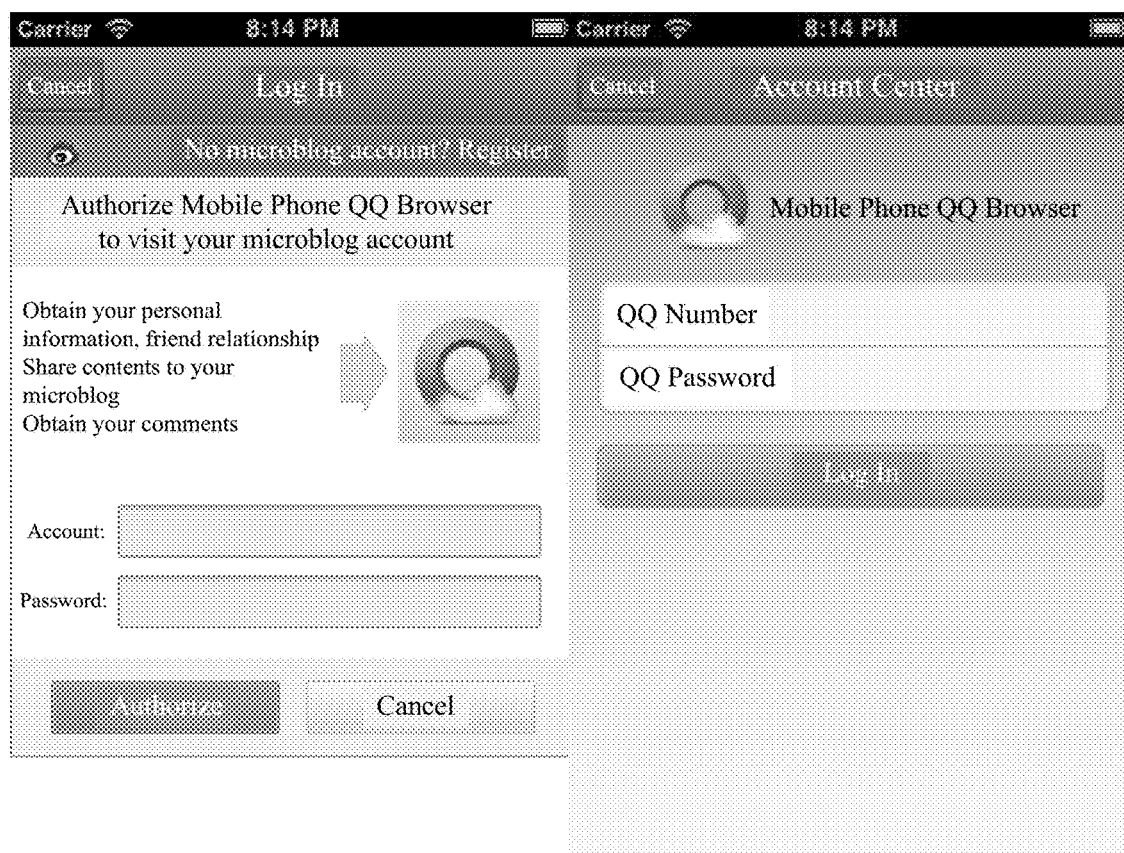
FIG. 4A
FIG. 4B

METHOD AND APPARATUS FOR SHARING BROWSER CONTENTS

CROSS-REFERENCES TO RELATED APPLICATIONS

This application is a continuation of PCT Patent Application No. PCT/CN2013/083408, filed on Sep. 12, 2013, which claims priority to Chinese Patent Application No. 201210341347.3, filed on Sep. 14, 2012, the entire contents of both of which are incorporated herein by reference.

FIELD OF THE DISCLOSURE

The present disclosure generally relates to Internet technology and, more particularly, relates to methods and apparatus for sharing browser contents.

BACKGROUND

During webpage browsing using a browser, when a user encounters websites or text contents of interest, the user may share the websites or text contents to third-party platforms via various sharing channels including microblogs or other sharing channels. Before sharing contents to a third-party platform, identity needs to be verified. However, current verification processes adopted by various existing platforms are not unified. That is, existing platforms have different requirements for the sharing processes.

For example, some microblogs respectively adopt different verification techniques and verification processes. Specifically, some microblogs use OAuth (an open standard for authorization) technique to verify identity. Thus, a user needs to jump to the official webpage of the microblog, and then jump back to the browser software after a successful login. The identity verification process is thus completed, and the subsequent sharing process can be performed. Such verification process needs repeated jumping from the official webpage of the microblog to the browser software, which complicates the sharing process.

In some cases, Sid (Security Identifier) is adopted as the identity verification technique by microblogs. Sid is commonly used internally within companies. When using Sid, a user can log in through any business interface to obtain an effective Sid, and use the Sid as an identification to complete the subsequent sharing process.

Thus, verification processes used by various platforms are not unified. As a result, when sharing contents, users have no clear expectations or unified understanding of the sharing process, which can affect user experience.

BRIEF SUMMARY OF THE DISCLOSURE

One aspect of the present disclosure includes a method for sharing browser contents using an electronic device. In this method, contents for sharing selected by a user and a sharing platform selected by the user can be received by the electronic device. The electronic device can jump to a unified verification interface for the user to log in to the sharing platform through the unified verification interface. Further, The electronic device can submit the contents to the sharing platform for sharing.

Another aspect of the present disclosure includes an apparatus for sharing browser contents. The apparatus can include, e.g., a sharing confirmation module, a platform login module, and a data submission module. The sharing confirmation module can be configured to receive contents for sharing selected by a user and a sharing platform selected by the user. The platform login module can be configured to jump to a unified verification interface for the user to log in to the sharing platform through the unified verification interface. The data submission module can be configured to submit the contents to the sharing platform for sharing.

Another aspect of the present disclosure includes a non-transitory computer-readable medium containing computer-executable program code. When being executed by a processor, the program code performs a method for sharing browser contents using an electronic device, and the method includes receiving contents for sharing selected by a user and a sharing platform selected by the user. The method also includes jumping to a unified verification interface for the user to log in to the sharing platform through the unified verification interface; and submitting the contents to the sharing platform for sharing.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

FIG. 3 depicts an exemplary operation principle of sharing browser contents in accordance with various disclosed embodiments;

FIGS. 4A-4B depict exemplary verification interfaces for sharing browser contents in accordance with various disclosed embodiments;

DETAILED DESCRIPTION

Reference will now be made in detail to exemplary embodiments of the disclosure, which are illustrated in the accompanying drawings.

Figure 8:
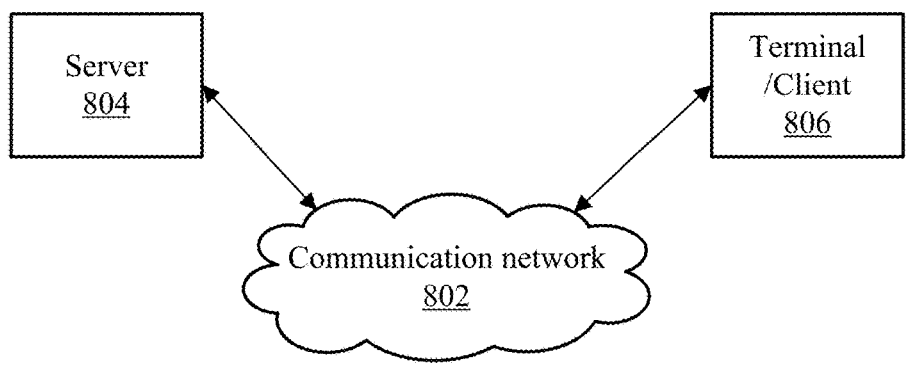
FIG. 8 depicts an exemplary environment incorporating certain disclosed embodiments.

FIG. 8 depicts an exemplary environment 800 incorporating exemplary methods and apparatus for sharing browser contents in accordance with various disclosed embodiments. As shown in FIG. 8, the environment 800 can include a server 804, a terminal 806, and a communication network 802. The server 804 and the terminal 806 may be coupled through the communication network 802 for information exchange, e.g., submitting/receiving contents for sharing, submitting/receiving login information for verification, webpage browsing, etc. Although only one terminal 806 and one server 804 are shown in the environment 800, any number of terminals 806 or servers 804 may be included, and other devices may also be included.

The communication network 802 may include any appropriate type of communication network for providing network connections to the server 804 and terminal 806 or among multiple servers 804 or terminals 806. For example, the communication network 802 may include the Internet or other types of computer networks or telecommunication networks, either wired or wireless.

A terminal, as used herein, may refer to any appropriate user terminal with certain computing capabilities, e.g., a personal computer (PC), a work station computer, a handheld computing device (e.g., a tablet), a mobile terminal (e.g., a mobile phone or a smart phone), or any other user-side computing device.

A server, as used herein, may refer to one or more server computers configured to provide certain server functionalities, e.g., webpage browsing, sharing contents or data, verifying user identity, etc. A server may also include one or more processors to execute computer programs in parallel.

Figure 9:
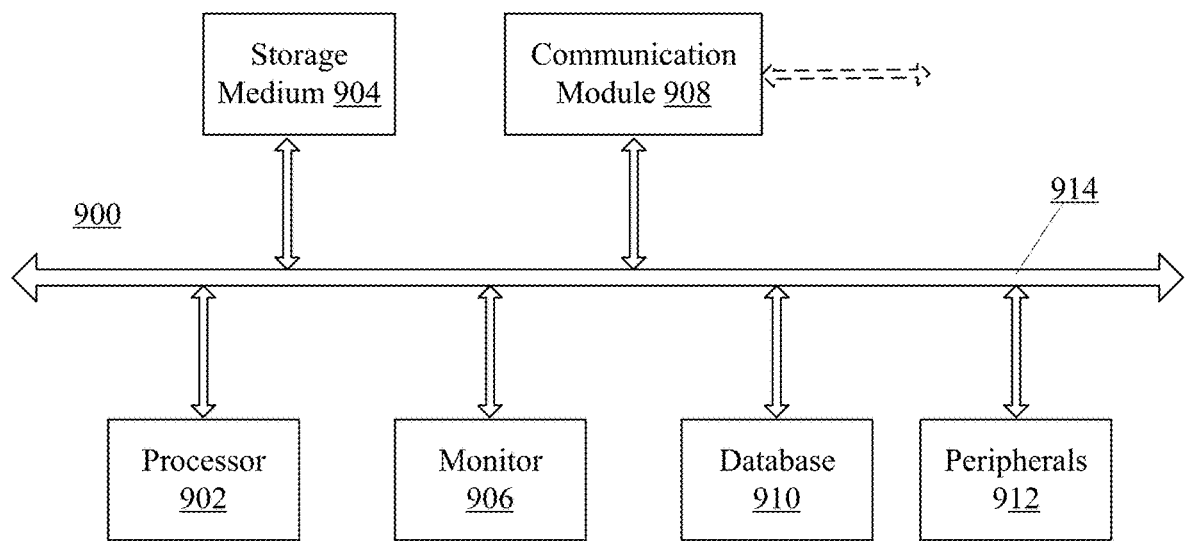
FIG. 9 depicts an exemplary system consistent with the disclosed embodiments.

The server 804 and the terminal 806 may be implemented on any appropriate computing platform. FIG. 9 shows a block diagram of an exemplary computing system 900 capable of implementing the server 804 and/or the terminal 806. As shown in FIG. 9, the exemplary computer system 900 may include a processor 902, a storage medium 904, a monitor 906, a communication module 908, a database 910, peripherals 912, and one or more bus 914 to couple the devices together. Certain devices may be omitted and other devices may be included.

The processor 902 can include any appropriate processor or processors. Further, the processor 902 can include multiple cores for multi-thread or parallel processing. The storage medium 904 may include memory modules, such as read-only memory (ROM), random access memory (RAM), and flash memory modules, and mass storages, such as CD-ROM, U-disk, removable hard disk, etc. The storage medium 904 may store computer programs for implementing various processes, when executed by the processor 902.

The monitor 906 may include display device or devices for displaying webpage contents, various interfaces such as verification interfaces, and/or other information from the system 900. The peripherals 912 may include I/O devices such as keyboard and mouse. The peripherals 912 may be used by the operator of terminal or server, for operations such as inputting contents/data, inputting login information, selecting contents for sharing, selecting sharing platform, etc.

Further, the communication module 908 may include network devices for establishing connections through the communication network 802. The database 910 may include one or more databases for storing certain data and for performing certain operations on the stored data, e.g., webpage browsing, database searching, etc. When the system 900 is the system of a server 804 of a certain sharing platform, the database can store user identity information or other suitable information.

In operation, the terminal 806 may cause the server 804 to perform certain actions, such as sharing contents or verifying login information, or other database operations. The server 804 may be configured to provide structures and functions for such actions and operations. The terminal 806 may be configured to provide suitable structures and functions for corresponding actions and operations. More particularly, the terminal 806 may include a browser and/or another suitable software/program for generating an interface for user to log in to the browser and/or third-party platform(s). The terminal 806 may submit contents to the server 804 of a sharing platform for sharing.

In various embodiments, a terminal involved in the disclosed methods and apparatus can include the terminal 806, while a server involved in the disclosed methods and apparatus can include the server 804. In various embodiments, the disclosed methods and apparatus can be executed by a terminal, such as an electronic device. The terminal can have a user input suitable information during the execution of the disclosed methods and apparatus. In one embodiment, the disclosed methods and apparatus can be executed using a browser, or any other suitable software/program to instruct related hardware within the terminal.

Figure 1:
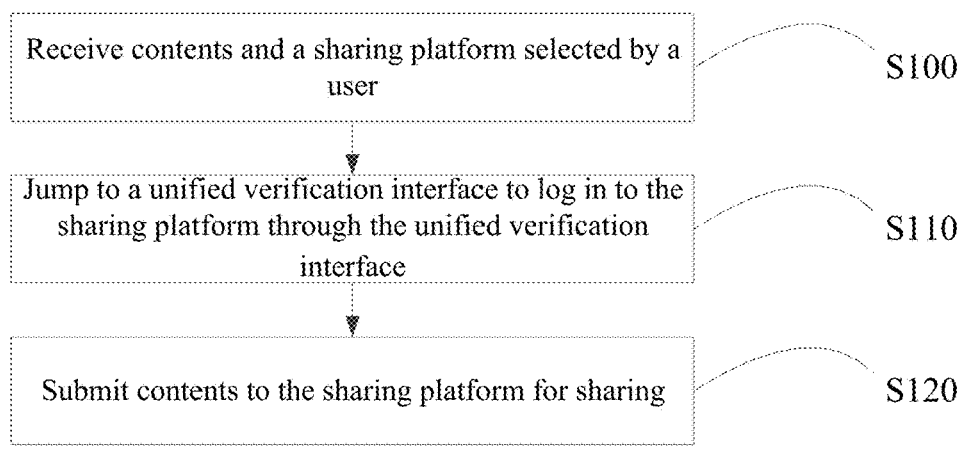
FIG. 1 depicts a flow diagram of an exemplary method for sharing browser contents in accordance with various disclosed embodiments.

FIG. 1 depicts a flow diagram of an exemplary method for sharing browser contents in accordance with various disclosed embodiments. As shown in FIG. 1, the exemplary method for sharing browser contents can include the following steps.

In Step S100, contents for sharing and a sharing platform are received. The contents for sharing and the sharing platform can be selected by a user. As used herein, unless otherwise specified, the term "contents for sharing" or "data for sharing" can be referred to as "contents" or "data", respectively.

Figure 2:
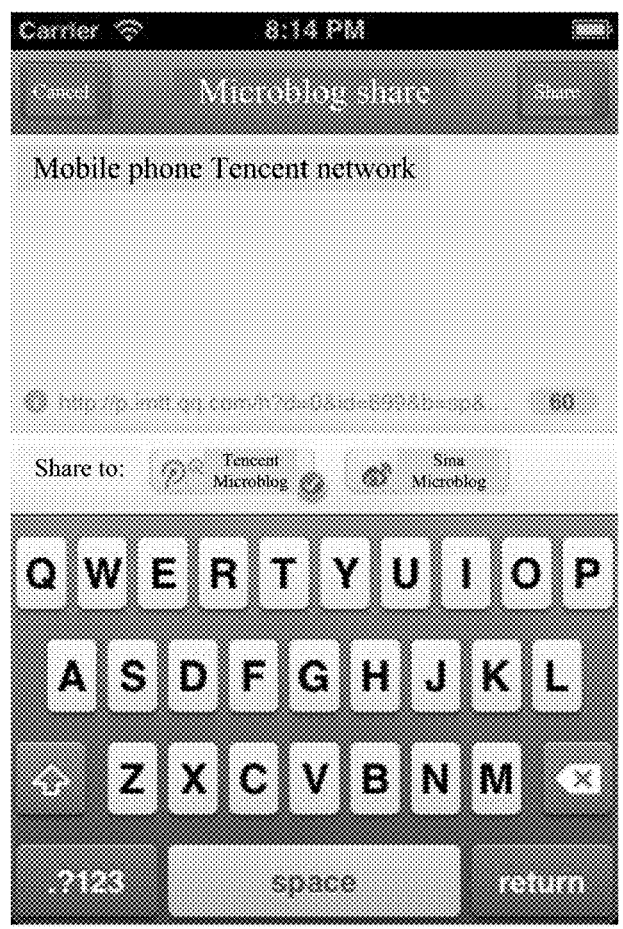
FIG. 2 depicts an exemplary interface for sharing browser contents in accordance with various disclosed embodiments.

In one embodiment, the sharing platform can be selected from various microblogs or other suitable sharing platforms. For example, FIG. 2 depicts an exemplary interface for sharing browser contents in accordance with various disclosed embodiments. Note that the sharing platform is not limited to microblogs, and any other suitable sharing platforms, e.g., SNS (Social Networking Services) websites, can be encompassed herein.

Referring to FIG. 2, the user may select contents for sharing. Contents can be any data suitable for sharing on sharing platforms. For example, the contents can be data typed in by the user (e.g., as shown in FIG. 2). For another example, the user may select webpage contents displayed on the electronic device.

The user may select a sharing platform among various options. The options of sharing platforms can depend on the settings of the electronic device. For example, the options of sharing platforms can include sharing platforms that the browser can access. In the example shown in FIG. 2, the user can select a sharing platform between Tencent Microblog and Sina Microblog.

In Step S110, the electronic device jumps to a unified verification interface. The user can log in to the corresponding sharing platform through the unified verification interface.

According to various disclosed embodiments, decentralized verification processes can be integrated into a unified verification process. Thus, verification processes of various different platforms can be unified. No matter to which platform the user shares the contents thereon, the user can log in through the same verification interface by inputting login information corresponding to the sharing platform. As a result, users can have clear expectations and unified understanding of the sharing process. So users' confusion can be reduced, and user experience can be improved. For example, the unified process is shown in further detail in FIGS. 3-4.

Specifically, FIG. 3 depicts an exemplary operation principle of sharing browser contents in accordance with various disclosed embodiments. Unlike using different sharing platforms (e.g., Microblog 1 and Microblog 2) with different verification processes, according to the disclosed operation principle as shown in FIG. 3, Microblog 1 and Microblog 2 may be accessed through a same unified verification process. Whichever the microblog the user selects, user identity verification and contents sharing can be performed through the same unified verification process.

FIGS. 4A-4B depict exemplary verification interfaces for sharing browser contents in accordance with various disclosed embodiments. Specifically, FIGS. 4A-4B depict two exemplary verification interfaces for a side-to-side comparison.

The verification interface shown in FIG. 4A depicts an exemplary unified verification interface for a user to log in to a sharing platform according to various disclosed embodiments. In the specific example as shown, the microblog is Sina Microblog (characterized by the eye-like logo near the top left corner), which uses OAuth technique to verify user identity.

As shown in FIG. 4A, after the user selects the contents and the sharing platform (in this example, Sina Microblog), the electronic device jumps to the unified verification interface. The user can input login information for the sharing platform. The user may also authorize the browser to visit (or access) the user's account at the sharing platform. In the specific example as shown in FIG. 4A, the browser is a QQ browser developed by Tencent. Thus, the sharing platform can receive the inputted login information and verify user identity. At the same time, the sharing platform can allow the browser to access the user's account at the sharing platform and submit contents for sharing in subsequent steps. Therefore, after a successful login through the unified verification interface, the sharing can be accomplished directly, and there is no need to jump back to the browser for the sharing process.

The verification interface shown in FIG. 4B depicts another exemplary verification interface for a user to log in to a sharing platform according to various disclosed embodiments. In the specific example as shown, the sharing platform is Tencent Microblog, characterized by the circle-and-cloud logo near the top left corner. Such sharing platforms adopt identity verification technique of Sid. A user can log in through any business interface (e.g., any business interface among a same company) to obtain an effective Sid, and use the Sid as an identification to complete the subsequent sharing process. For example, a user may log in through a QQ browser (a browser created by Tencent), and thus can access Tencent Microblog for content sharing.

As shown in FIG. 4B, after the user selects the contents and the sharing platform (in this example, Tencent Microblog), the interface of the electronic device jumps to the unified verification interface. The user can input login information (in this example, the login information for the QQ browser). When the user successfully logs in to the QQ browser, the user simultaneously gets access to the Tencent Microblog. The browser can thus access the user's account at the sharing platform and submit contents for sharing in subsequent steps.

As disclosed herein, in both exemplary verification interfaces shown in FIGS. 4A-4B, the user inputs login information corresponding to the selected sharing platform. There is no need to jump to the official webpage of the microblog to log in. The user can expect a unified verification process and interface for any sharing platform that the user selects. Thus, verification processes of various different platforms can be unified.

The verification interfaces using OAuth and Sid shown in FIGS. 4A-4B are only exemplary. Other suitable sharing platforms and other suitable verification techniques can be integrated into the disclosed unified sharing and verification process in accordance with various embodiments without limitation.

Referring back to FIG. 1, in Step S120, contents are submitted to the corresponding sharing platform.

In this case, after the user logs in, contents can be directly submitted to the corresponding sharing platform (i.e., a third-party platform). There is no need to jump back to the browser to perform the sharing process. Thus, jumping processes can be reduced, and sharing process can be more convenient.

Figure 5:
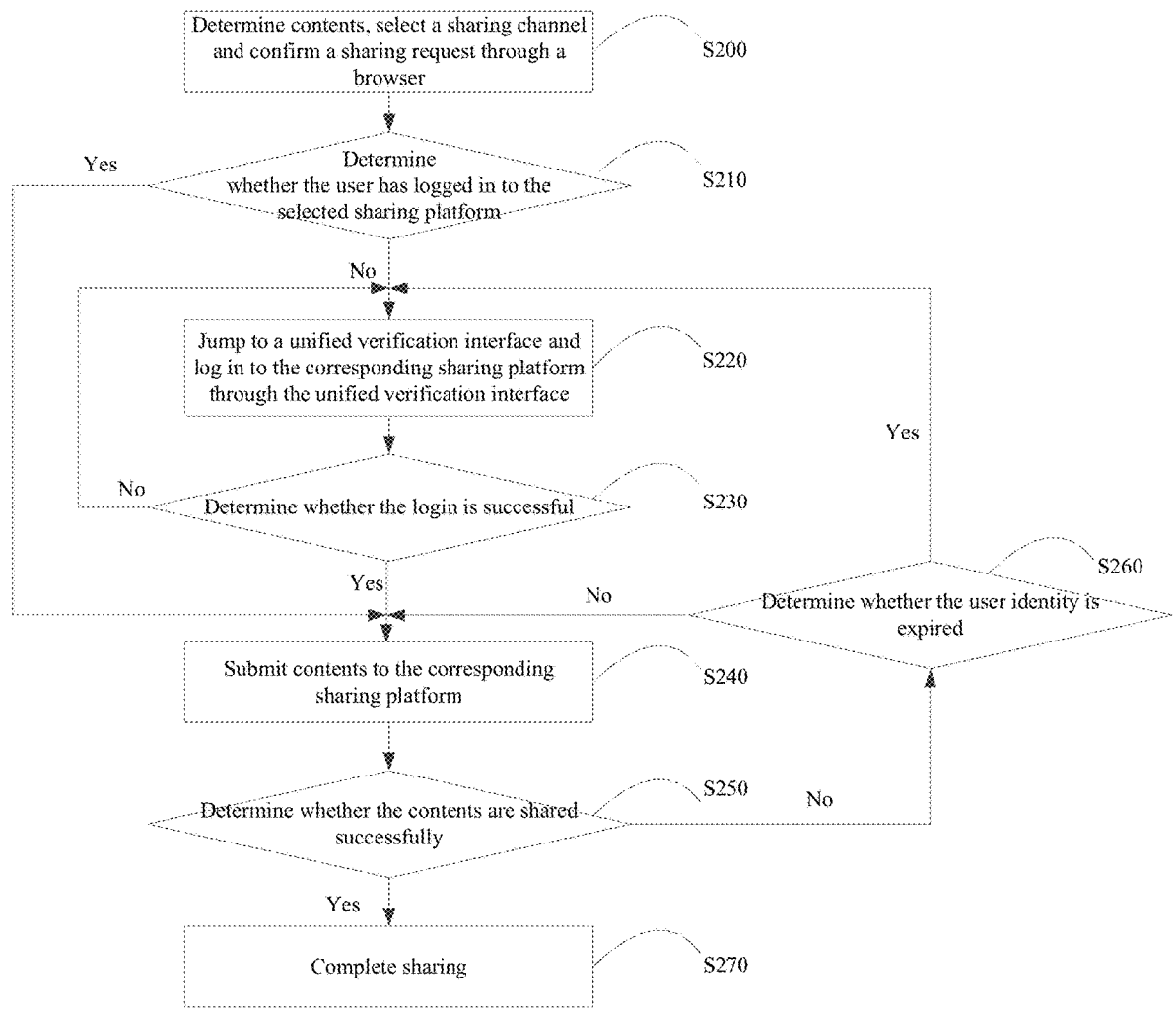
FIG. 5 depicts a flow diagram of another exemplary method for sharing browser contents in accordance with various disclosed embodiments.

FIG. 5 depicts a flow diagram of another exemplary method for sharing browser contents in accordance with various disclosed embodiments. As shown in FIG. 5, the exemplary method for sharing browser contents can include the following steps.

In Step S200, contents for sharing are determined through a browser. A sharing channel can be selected and a user's sharing request can be confirmed.

In this case, the sharing channel can refer to a third-party platform to which the contents are shared thereon. The sharing channel can include, for example, various microblogs, as shown in FIG. 2. As disclosed herein, the third-party platform is not limited to microblogs, and any other suitable sharing platforms, e.g., SNS websites, can be encompassed herein.

Optionally, in Step S210, it is determined whether the user has already logged in to the selected sharing platform. If/when the user has not logged in, Step S220 can be performed. If/when the user has logged in, Step S240 can be performed. In one embodiment, in Step S210, it can be determined that the user has already logged in, so Step S240 can be performed and Step 220 can be skipped.

In Step S220, the user jumps to a unified verification interface. The user can log in to the corresponding sharing platform through the unified verification interface.

According to various disclosed embodiments, decentralized verification processes can be integrated into a unified verification process. Thus, verification processes of various different platforms can be unified. No matter to which platform the user shares contents thereon, the user can log in through the same verification interface by inputting login information corresponding to the sharing platform. As a result, users can have clear expectations and unified understanding of the sharing process. So users' confusion can be reduced, and user experience can be improved. As discussed above, the unified process is shown in further detail in FIGS. 3-4.

Optionally, in Step S230, it is determined whether the login (or logging in) is successful. If/when the login is not successful, Step S220 can be repeated. If/when the login is successful, Step S240 can be performed.

In Step S240, the data (or the contents) are submitted to the corresponding sharing platform.

In Step S240, if/when the user's login is successful, contents can be directly submitted to the third-party platform. There is no need to jump back to the browser to perform the sharing process. Thus, jumping processes can be reduced, and the sharing process can be more convenient.

Optionally, in Step S250, it is determined whether the sharing process is successful. If/when the sharing process is not successful, Step S260 can be performed. If/when the sharing is successful, Step S270 can be performed.

Optionally, in Step S260, it is determined whether the user identity (i.e., the user's identity) is expired. If/when the user identity is expired, Step S220 can be performed. If/when the user identity is not expired, Step S240 can be repeated.

In Step S260, the user identity can be the user's login information. In one embodiment, to ensure security of the user's information, if login time is too long, login information can be expired (i.e., user identity can be expired), and the user may need to log in again.

In Step S270, the sharing process is completed.

Figure 6:
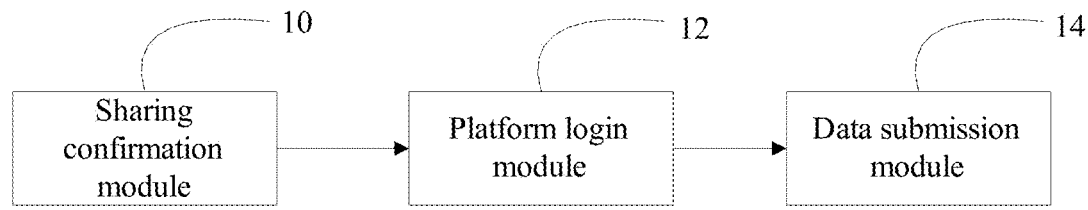
FIG. 6 depicts a structure diagram of an exemplary apparatus for sharing browser contents in accordance with various disclosed embodiments.

FIG. 6 depicts a structure diagram of an exemplary apparatus for sharing browser contents in accordance with various disclosed embodiments. As shown in FIG. 6, the exemplary apparatus for sharing browser contents can include a sharing confirmation module 10, a platform login module 12, and a data submission module 14. Some modules may be omitted and other modules may also be included.

The sharing confirmation module 10 is configured to receive selected contents and sharing platform.

In one embodiment, the sharing platform can be selected from various microblogs or other suitable sharing platforms. For example, FIG. 2 depicts an exemplary interface for sharing browser contents in accordance with various disclosed embodiments. Note that the sharing platform is not limited to microblogs, and any other suitable sharing platforms, e.g., SNS websites, can be encompassed herein.

The platform login module 12 is configured to jump to a unified verification interface, so the user can log in to the corresponding sharing platform through the verification interface. As disclosed in various embodiments, decentralized verification processes can be integrated into a unified verification process. Thus, verification processes of various different platforms can be unified. No matter to which platform the user shares contents thereon, the user can log in through a unified verification interface by inputting login information corresponding to the sharing platform. As a result, users can have clear expectations and unified understanding of the sharing process. So users' confusion can be reduced, and user experience can be improved. The unified process is shown in further detail in FIGS. 3-4.

The data submission module 14 is configured to submit contents to the corresponding sharing platform. After the user logs in, contents can be directly submitted to the corresponding sharing platform (i.e., a third-party platform). There is no need to jump back to the browser to perform the sharing process. Thus, jumping processes can be reduced, and sharing process can be more convenient.

Figure 7:
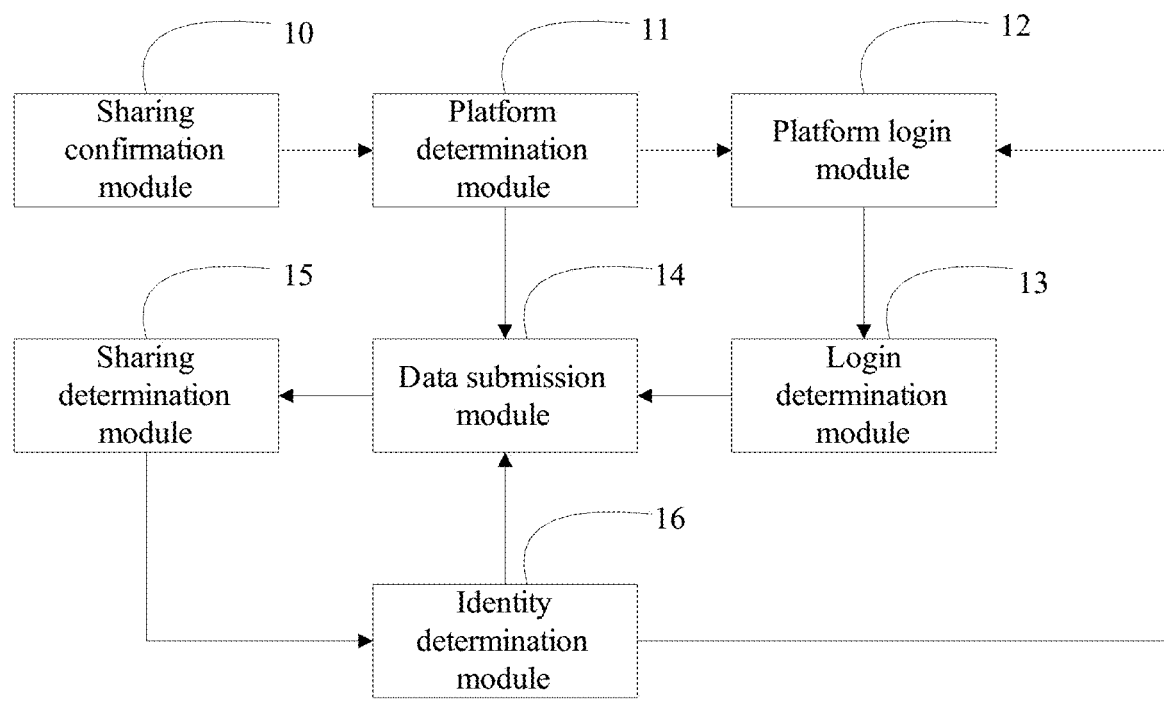
FIG. 7 depicts a structure diagram of another exemplary apparatus for sharing browser contents in accordance with various disclosed embodiments.

FIG. 7 depicts a structure diagram of another exemplary apparatus for sharing browser contents in accordance with various disclosed embodiments. As shown in FIG. 7, the exemplary apparatus for sharing browser contents can include a sharing confirmation module 10, a platform determination module 11 (optional), a platform login module 12, a login determination module 13 (optional), a data submission module 14, a sharing determination module 15 (optional), and an identity determination module 16 (optional). Some modules may be omitted and other modules may also be included.

The sharing confirmation module 10 is configured to, through a browser, determine contents for sharing, select a sharing channel and/or confirm a user's sharing request.

In this case, the sharing channel can refer to a third-party platform to which the contents are shared thereon. The sharing channel can include, for example, various microblogs, as shown in FIG. 2. As disclosed herein, the third-party platform is not limited to microblogs, and any other suitable sharing platforms, e.g., SNS websites, can be encompassed herein.

Optionally, the platform determination module 11 is configured to determine whether the user has already logged in to the selected sharing platform. If/when the user has not logged in, the user can log in through the platform login module 12. If/when the user has logged in, contents (or data) can be submitted through the data submission module 14.

The platform login module 12 is configured to jump to a unified verification interface, so the user can log in to the corresponding sharing platform through the verification interface. As disclosed in various embodiments, decentralized verification processes can be integrated into a unified verification process. Thus, verification processes of various different platforms can be unified. No matter to which platform the user shares contents thereon, the user can log in through a unified verification interface by inputting login information corresponding to the sharing platform. As a result, users can have clear expectations and unified understanding of the sharing process. So users' confusion can be reduced, and user experience can be improved. The unified process is shown in further detail in FIGS. 3-4.

Optionally, the login determination module 13 is configured to determine whether the login is successful. If/when the login is not successful, the user can log in again through the platform login module 12. If/when the login is successful, contents (or data) can be submitted through the data submission module 14.

The data submission module 14 is configured to submit the data to the corresponding sharing platform. If/when the user's login is successful, contents can be directly submitted to the third-party platform. There is no need to jump back to the browser to perform the sharing process. Thus, jumping processes can be reduced, and sharing process can be more convenient.

Optionally, the sharing determination module 15 is configured to determine whether the sharing process is successful. If/when the sharing process is not successful, through the identity determination module 16, it can be determined whether the user identity (i.e., the user's identity) is expired. If/when the sharing process is successful, the sharing process can be completed.

Optionally, the identity determination module 16 is configured to determine whether the user identity is expired. If/when the user identity is expired, the user can log in again through the platform login module 12. If/when the user identity is not expired, the data can be submitted again through the data submission module 14.

The user identity can be the user's login information. In one embodiment, to ensure security of user's information, if login time is too long, the login information can be expired, and the user may need to log in again.

According to the methods and apparatus for sharing browser contents in various disclosed embodiments, decentralized verification processes can be integrated into a unified verification process. Thus, verification processes of various different platforms can be unified. No matter to which platform the user shares contents thereon, the user can log in through a unified verification interface by inputting login information corresponding to the sharing platform. As a result, users can have clear expectations and unified understanding of the sharing process. So users' confusion can be reduced, and user experience can be improved.

Further, after the user successfully logs in, the contents can be directly submitted to the corresponding sharing platform (i.e., the third-party platform). There is no need to jump back to the browser to perform the sharing process. Thus, jumping processes can be reduced, and sharing process can be more convenient. Furthermore, the disclosed methods and apparatus can have high extensibility. For example, additional third-party sharing channels, e.g., Qzone (i.e., a social networking website created by Tencent), can be conveniently accessed and integrated into the unified verification process.

In addition, one or more or all of the steps in each of the exemplary methods disclosed herein can be accomplished using a program/software to instruct related hardware. When such program/software is executed, one or more or all of the steps in each of the exemplary methods may be realized. Such program/software can be stored in a computer readable storage medium including, e.g., magnetic disk, optical disk, ROM, or RAM, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and apparatus can be used in a variety of Internet applications. By using the disclosed methods and apparatus, an electronic device can receive contents for sharing selected by a user and a sharing platform selected by the user. The electronic device can jump to a unified verification interface for the user to log in to the sharing platform through the unified verification interface. After the user successfully logs in, the electronic device can submit the contents to the sharing platform for sharing.

According to the methods and apparatus for sharing browser contents in various disclosed embodiments, decentralized verification processes can be integrated into a unified verification process. Thus, verification processes of various different platforms can be unified. No matter to which platform the user shares contents thereon, the user can log in through a unified verification interface by inputting login information corresponding to the sharing platform. As a result, users can have clear expectations and unified understanding of the sharing process. So users' confusion can be reduced, and user experience can be improved.

Further, after the user successfully logs in, the contents can be directly submitted to the corresponding sharing platform (i.e., the third-party platform). There is no need to jump back to the browser to perform the sharing process. Thus, jumping processes can be reduced, and sharing process can be more convenient. Furthermore, the disclosed methods and apparatus can have high extensibility. For example, additional third-party sharing channels, e.g., Qzone (i.e., a social networking website created by Tencent), can be conveniently accessed and integrated into the unified verification process.

What is claimed is:

1. A method for sharing browser contents using an electronic device, comprising:
providing, by a browser, a content sharing interface including multiple selection options corresponding to multiple sharing platforms, wherein each sharing platform is a social network service (SNS) website that provides a service of content sharing based on user identities, and the multiple sharing platforms employ different user identity verification techniques;
receiving, by the browser, contents for sharing selected by a user and a sharing platform selected by the user from the multiple sharing platforms;
in response to receiving the contents and the sharing platform selected by the user, jumping, by the browser, to a unified verification interface for the user to log in to the selected sharing platform through the unified verification interface, wherein the unified verification interface is configured to request user authorization for accessing a user account of the sharing platform by the browser; and
receiving, by the browser, a successful login confirmation from the sharing platform based on user information inputted to the unified verification interface;
in response to receiving the successful login confirmation, directly submitting, by the browser, the contents to the sharing platform for sharing without directing the user to an official webpage of the selected sharing platform, the selected sharing platform being a SNS website;
wherein: the unified verification interface provided and integrated locally by the browser is configured to support: OAuth technique implemented by a first platform of the multiple sharing platforms, and Security Identifier technique implemented by a second platform of the multiple sharing platforms;
the same unified verification interface is provided for the user to enter login information regardless of which sharing platform the user selects; and
the user information inputted to the unified verification interface is only used for logging into the single sharing platform previously-selected by the user among the multiple selection options indicating the multiple sharing platforms on the content sharing interface of the browser, and different sharing platforms correspond to different user login information.

2. The method according to claim 1, further comprising:
before the jumping to the unified verification interface, determining whether the user has logged in to the selected sharing platform;
when the user has not logged in, jumping to the unified verification interface for the user to log in to the sharing platform through the unified verification interface; and
when the user has logged in, submitting the contents to the sharing platform for sharing.

3. The method according to claim 2, further comprising:
before the submitting of the contents to the sharing platform, determining whether the user is successfully logged in through the unified verification interface;
when the user is not successfully logged in, jumping to the unified verification interface again for the user to log in to the sharing platform through the unified verification interface; and
when the user is successfully logged in, submitting the contents to the sharing platform for sharing.

4. The method according to claim 2, further comprising:
after the submitting of the contents to the sharing platform for sharing, determining whether the contents are successfully shared;
when the contents are not successfully shared, determining whether a user identity is expired; and
when the contents are successfully shared, completing the sharing.

5. The method according to claim 4, further comprising:
when the user identity is expired, jumping to the unified verification interface for the user to log in to the sharing platform through the unified verification interface; and
when the user identity is not expired, re-submitting the contents to the sharing platform for sharing.

6. An apparatus for sharing browser contents, comprising:
a memory storing a browser application, and a processor, when executing the browser application, the processor is configured to:
provide a content sharing interface including multiple selection options corresponding to multiple sharing platforms, wherein each sharing platform is a social network service (SNS) website that provides a service of content sharing based on user identities, and the multiple sharing platforms employ different user identity verification techniques;
receive contents for sharing selected by a user and a sharing platform selected by the user from the multiple sharing platforms;
in response to receiving the contents and the sharing platform selected by the user, jumping, by the browser, to a unified verification interface for the user to log in to the selected sharing platform through the unified verification interface, wherein the unified verification interface is configured to request user authorization for accessing a user account of the selected sharing platform by the browser;
receive a successful login confirmation from the sharing platform based on user information inputted to the unified verification interface; and
in response to receiving the successful login confirmation, directly submit the contents to the sharing platform without directing the user to an official webpage of the selected sharing platform, the selected sharing platform being a SNS website;
wherein: the unified verification interface provided and integrated locally by the browser is configured to support: OAuth technique implemented by a first platform of the multiple sharing platforms, and Security Identifier technique implemented by a second platform of the multiple sharing platforms;
the same unified verification interface is provided for the user to enter login information regardless of which sharing platform the user selects; and
the user information inputted to the unified verification interface is only used for logging into the single sharing platform previously-selected by the user among the multiple selection options corresponding to the multiple sharing platforms on the content sharing interface of the browser.

7. The apparatus according to claim 6, wherein the processor is further configured to:
determine whether the user has already logged in to the selected sharing platform, wherein
when the user has not logged in, jump to the unified verification interface for the user to log in through the unified verification interface, and
when the user has logged in, submit the contents to the sharing platform for sharing.

8. The apparatus according to claim 7, wherein the processor is further configured to:
determine whether the user is successfully logged in through the unified verification interface, wherein
when the user is not successfully logged in, jump to the unified verification interface again for the user to log in, and
when the user is successfully logged in, submit the contents to the sharing platform for sharing.

9. The apparatus according to claim 7, wherein the processor is further configured to:
determine whether the contents are successfully shared; and
determine whether a user identity is expired, wherein
when the contents are not successfully shared, the identity determination module determines whether the user identity is expired, and
when the contents are successfully shared, the sharing is completed.

10. The apparatus according to claim 9, wherein
when the user identity is expired, the platform login module is configured to jump to the unified verification interface for the user to log in, and
when the user identity is not expired, the data submission module is configured to re-submit the contents to the sharing platform for sharing.

11. A non-transitory computer-readable medium containing computer-executable program code for, when being executed by a processor, performing a method for sharing browser contents using an electronic device, the method comprising:
providing, by a browser, a content sharing interface including multiple selection options corresponding to multiple sharing platforms, wherein each sharing platform is a social network service (SNS) website that provides a service of content sharing based on user identities, and the multiple sharing platforms employ different user identity verification techniques;
receiving, by the browser, contents for sharing selected by a user and a sharing platform selected by the user from the multiple sharing platforms;
in response to receiving the contents and the sharing platform selected by the user, jumping, by the browser, to a unified verification interface for the user to log in to the selected sharing platform through the unified verification interface, wherein the unified verification interface is configured to request user authorization for accessing a user account of the selected sharing platform by the browser; and
receiving, by the browser, a successful login confirmation from the sharing platform based on user information inputted to the unified verification interface;
in response to receiving the successful login confirmation, directly submitting, by the browser, the contents to the sharing platform for sharing without directing the user to an official webpage of the selected sharing platform, the selected sharing platform being a SNS website;
wherein: the unified verification interface provided and integrated locally by the browser is configured to support: OAuth technique implemented by a first platform of the multiple sharing platforms, and Security Identifier technique implemented by a second platform of the multiple sharing platforms;
the same unified verification interface is provided for the user to enter login information regardless of which sharing platform the user selects; and
the user information inputted to the unified verification interface is only used for logging into the single sharing platform previously-selected by the user among the multiple selection options corresponding to the multiple sharing platforms on the content sharing interface of the browser.

12. The computer-readable medium according to claim 11, the method further comprising:
- before the jumping to the unified verification interface, determining whether the user has logged in to the selected sharing platform;
- when the user has not logged in, jumping to the unified verification interface for the user to log in to the sharing platform through the unified verification interface; and
- when the user has logged in, submitting the contents to the sharing platform for sharing.

13. The computer-readable medium according to claim 12, the method further comprising:
- before the submitting of the contents to the sharing platform, determining whether the user is successfully logged in through the unified verification interface;
- when the user is not successfully logged in, jumping to the unified verification interface again for the user to log in to the sharing platform through the unified verification interface; and
- when the user is successfully logged in, submitting the contents to the sharing platform for sharing.

14. The computer-readable medium according to claim 12, the method further comprising:
- after the submitting of the contents to the sharing platform for sharing, determining whether the contents are successfully shared;
- when the contents are not successfully shared, determining whether a user identity is expired; and
- when the contents are successfully shared, completing the sharing.

15. The computer-readable medium according to claim 14, the method further comprising:
- when the user identity is expired, jumping to the unified verification interface for the user to log in to the sharing platform through the unified verification interface; and
- when the user identity is not expired, re-submitting the contents to the sharing platform for sharing.

* * * * *